(12) United States Patent
McGahan

(10) Patent No.: US 8,020,312 B1
(45) Date of Patent: Sep. 20, 2011

(54) UNIVERSAL TAPE AND DRYWALL SCORING APPARATUS

(76) Inventor: Brad McGahan, Simi Valley, CA (US)

( * ) Notice: Subject to any disclaimer, the term of this patent is extended or adjusted under 35 U.S.C. 154(b) by 0 days.

(21) Appl. No.: 12/799,892

(22) Filed: May 3, 2010

(51) Int. Cl.
*G01B 3/10* (2006.01)
*B26B 11/00* (2006.01)
*B26B 29/00* (2006.01)

(52) U.S. Cl. .................. 33/770; 33/760; 33/768; 33/42; 7/163; 30/286; 30/293; 30/294

(58) Field of Classification Search .................... 33/755, 33/757–760, 768–770, 668, 42; 7/163, 164; 30/282, 285, 286, 289–292, 294, 295
See application file for complete search history.

(56) References Cited

U.S. PATENT DOCUMENTS

| | | | |
|---|---|---|---|
| 4,255,856 A | 3/1981 | Mackie | |
| 4,993,093 A | 2/1991 | Goldwitz | |
| 5,113,596 A * | 5/1992 | Meyers | 33/770 |
| 5,241,750 A * | 9/1993 | Chomiak | 30/2 |
| 5,289,637 A | 3/1994 | Coffey | |
| 5,406,711 A * | 4/1995 | Graham | 33/42 |
| 5,782,007 A * | 7/1998 | Harris | 33/768 |
| 5,966,820 A | 10/1999 | Cornacchio et al. | |
| 5,979,063 A | 11/1999 | Pritz | |
| 6,367,154 B2 | 4/2002 | Degabli | |
| 6,510,622 B2 * | 1/2003 | Laughlin et al. | 33/770 |
| 6,553,684 B2 * | 4/2003 | Jenkins et al. | 33/770 |
| 6,763,603 B2 | 7/2004 | Carrabino | |
| 6,912,799 B1 | 7/2005 | Smith | |
| 7,062,859 B1 * | 6/2006 | Revnell | 33/32.1 |
| 7,260,898 B2 | 8/2007 | Snelson | |
| 7,266,854 B1 | 9/2007 | Gomez | |
| 7,287,329 B2 | 10/2007 | Cornacchio | |
| 2003/0019116 A1 | 1/2003 | DeWall | |
| 2008/0141549 A1 | 6/2008 | Brown | |
| 2009/0249636 A1 | 10/2009 | Reda et al. | |

* cited by examiner

*Primary Examiner* — Amy Cohen Johnson
(74) *Attorney, Agent, or Firm* — James E. Brunton

(57) ABSTRACT

A universal tape and drywall scoring apparatus for use with a tape measure that includes a tape measure encasement for encasing a portion of the tape measure housing, a clip assembly connected to the distal end of the measuring tape, the clip assembly comprising a hollow housing having a top wall provided with a slot and a pair of spaced apart side walls each having a cavity formed therein, and a cutting assembly connected to the clip assembly, the cutting assembly comprising a scoring blade receivable within the slot in the top wall of the hollow housing of the clip assembly and a pair of spaced apart connector clips having end portions receivable the cavities formed in the side walls of the clip assembly.

18 Claims, 6 Drawing Sheets

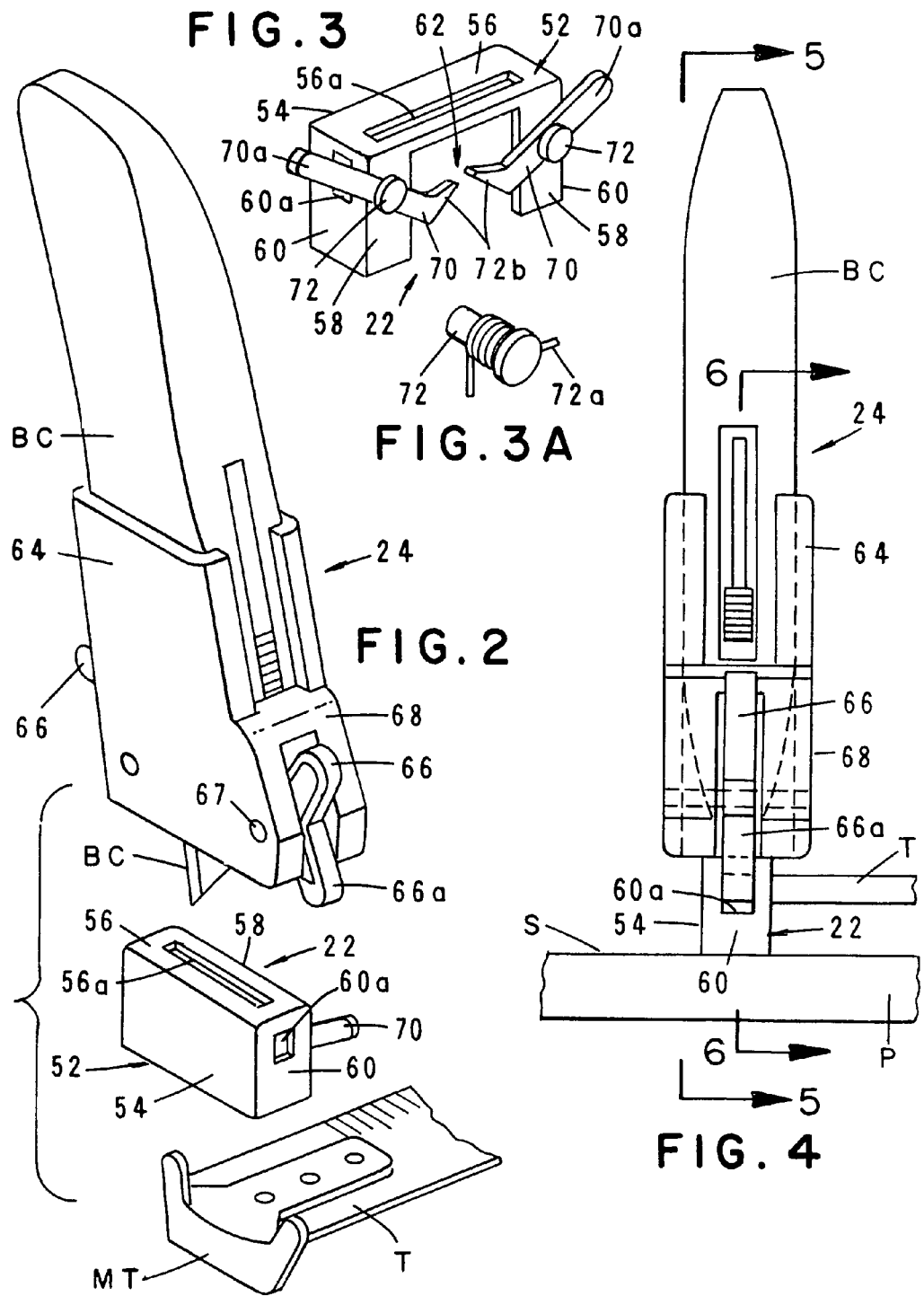

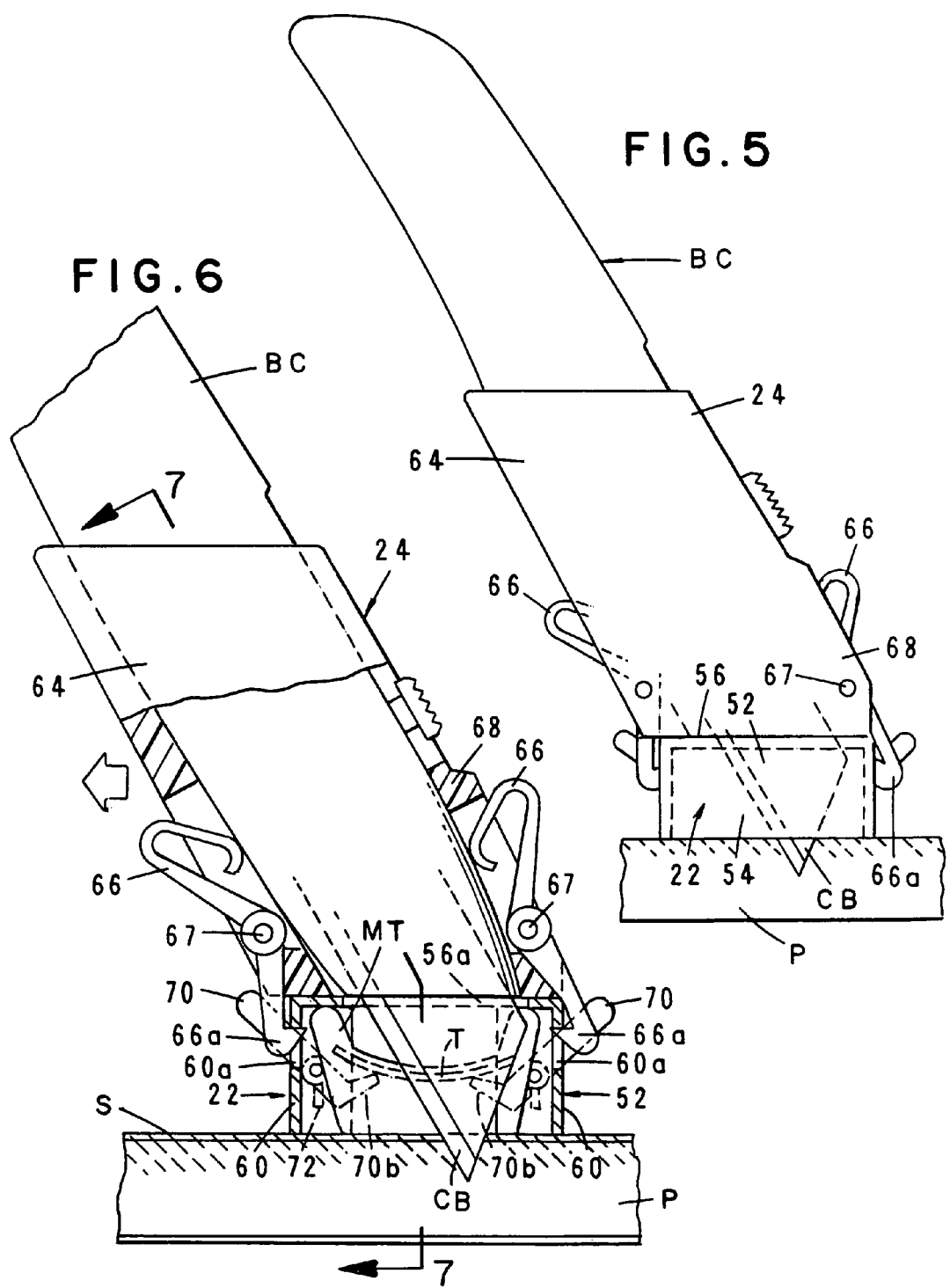

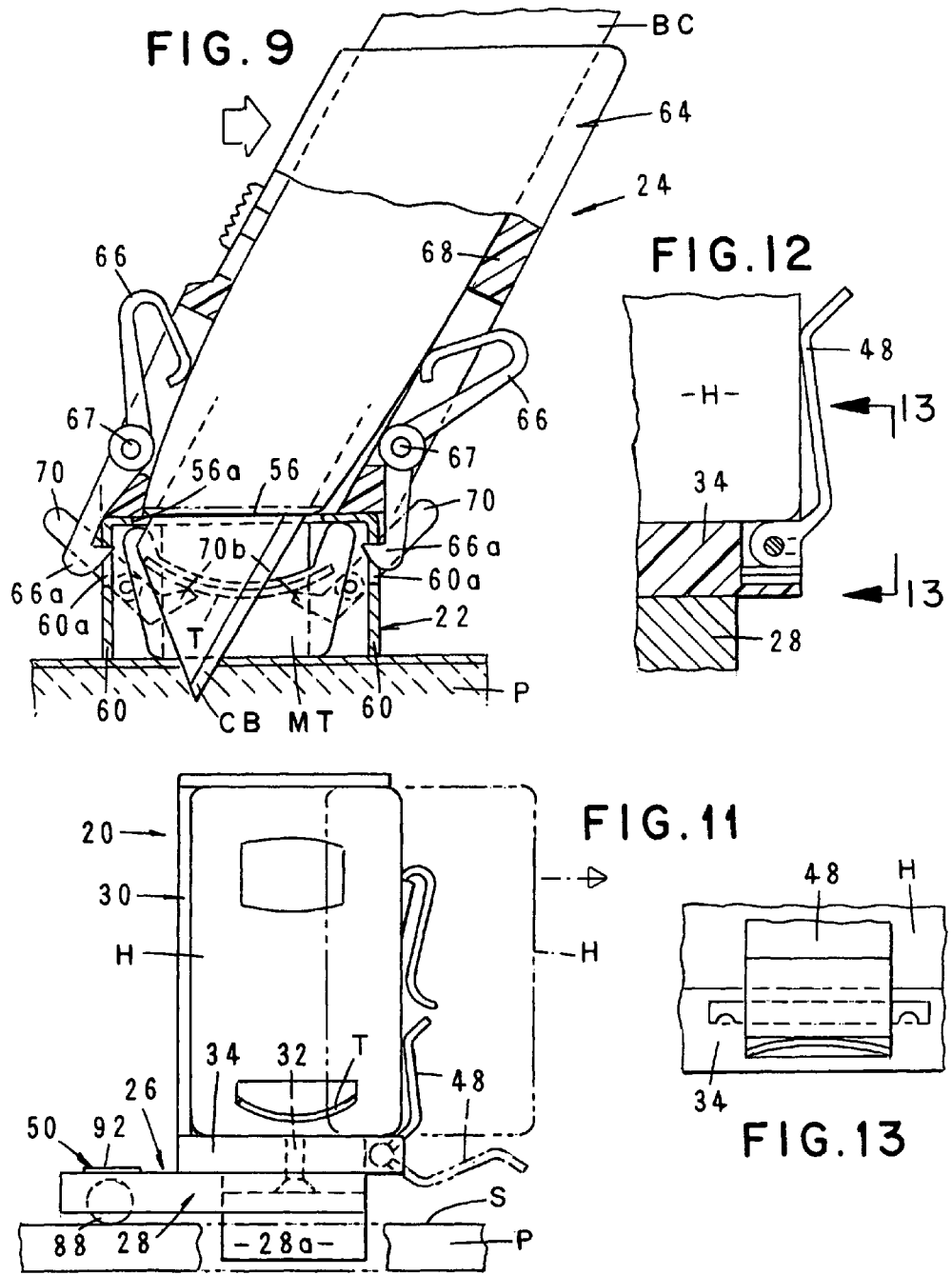

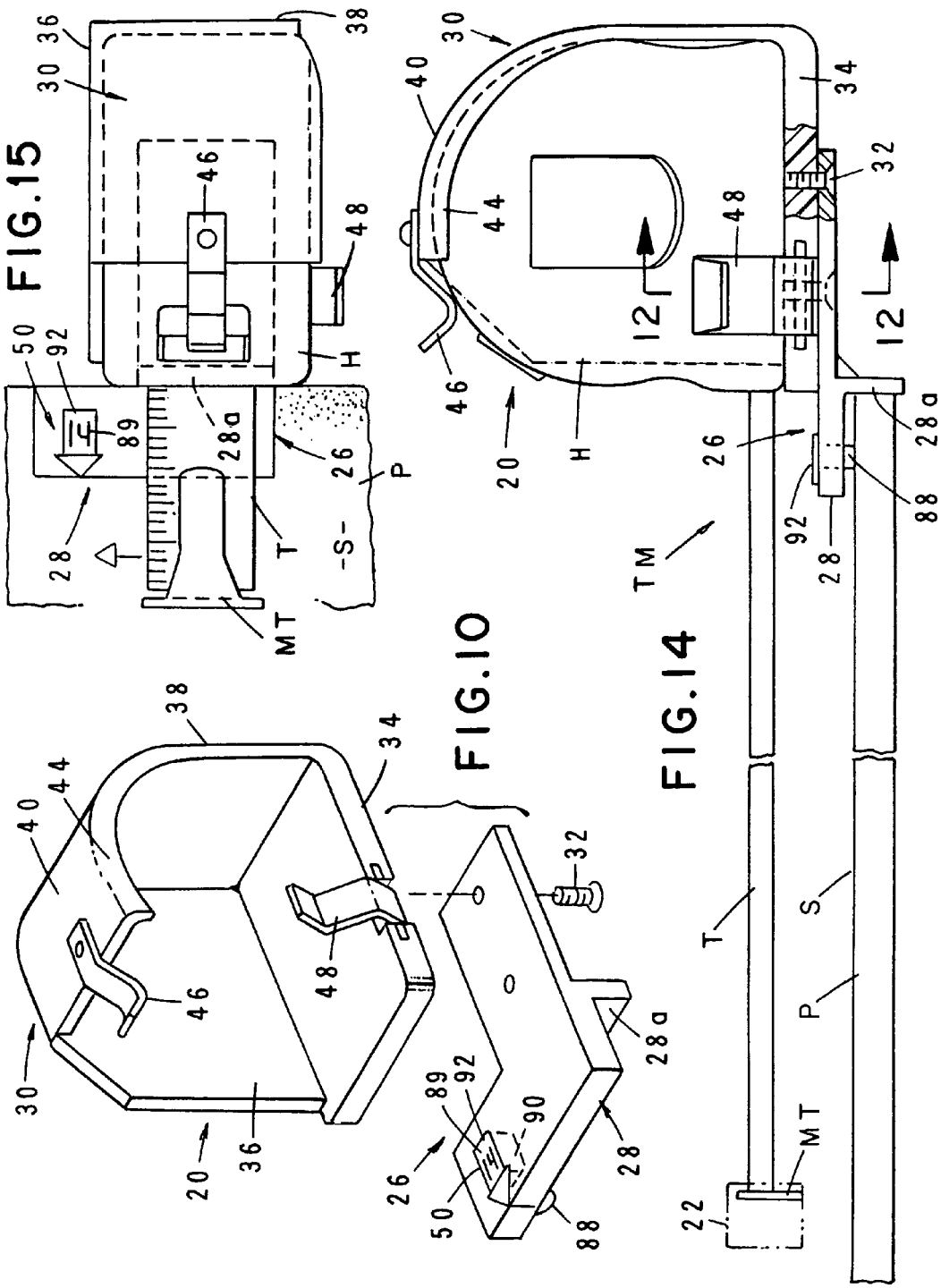

UNIVERSAL TAPE AND DRYWALL SCORING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to measuring, marking and cutting tools of the character used in the construction industry. More particularly, the invention concerns an apparatus for use in combination with a tape measure having a housing and a self-recoiling measuring tape extendible from the housing for measuring, marking and scoring dry wall.

2. Discussion of the Prior Art

In the construction industry, there is a recurring need for measuring, marking and cutting tools for use in connection with planar materials such as drywall. In practice, there are individual tools, such as large drywall squares, that are available which accomplish the various tasks required to mark, cut and finish a sheet of material. The problem lies in the fact that the requirement to use various individual tools is cumbersome and time consuming by the user to finish the particular task at hand.

U.S. Pat. No. 6,763,603 issued to Carrabino concerns a tape scriber formed as an integral device, either molded or cast, that includes a base portion, having a cavity formed therein, for accommodating the tab end of the tape. The base portion includes a laterally extending stem, having a slot there through, and into which a box cutter may locate its razor tip, in preparation for cutting of a board during usage. A rearwardly extending member includes an inclined slot, or at least a slot which accommodates a pencil upon an incline with the tip of the pencil extending through a bottom aperture, aligning under the precise end of the tape, to furnish a scribe or pencil mark at that location, as the rule is moved, to the exact dimension measured on its tape during usage.

U.S. Pat. No. 6,931,734 issued to Elder et al. discloses an implement alignment and guide system that comprises a tool which is adapted to be used in conjunction with a measuring tape to enable a worker to make accurate alignment marks while engaging in the art of carpentry, drywall, insulation and so forth.

The U.S. Pat. No. 6,694,622 to Kim discloses a combination measuring, marking and cutting tool that comprises a housing, a measuring tape extendable from the housing, a ferrule attached to the free end of the measuring tape, an aperture formed in the ferrule, and a T-shaped pivot tab secured to the housing in proximity to the measuring tape.

BRIEF SUMMARY OF THE INVENTION

By way of brief summary, the present invention concerns the use in combination with a tape measure having a housing and an elongate tape extendible from the housing, the tape measure having a tab end, a universal tape and drywall scoring apparatus that includes a tape measure encasement for encasing a portion of the tape measure housing, a clip assembly connected to the distal end of the measuring tape, the clip assembly comprising a hollow housing having a top wall provided with a slot and a pair of spaced apart side walls each having a cavity formed therein, and a cutting assembly connected to the clip assembly, the cutting assembly comprising a scoring blade receivable within the slot in the top wall of the hollow housing of the clip assembly and a pair of spaced apart connector clips having end portions receivable the cavities formed in the side walls of the clip assembly.

With the forgoing in mind, it is an object of the invention to provide a universal tape and drywall scoring apparatus in which, during use, the tape measure housing of the tape is securely contained within a compact, easy to grip tape measure encasement.

Another object of the invention is to provide a universal tape and drywall scoring apparatus of the character described in the preceding paragraphs in which, during use, the tab end of the tape measure can be positively secured within a cutting assembly with which a conventional type of box cutter can be quickly and easily interconnected and disconnected.

Another object of the invention is to provide a universal tape and drywall scoring apparatus of the type described in the preceding paragraph in which the clip assembly of the device can be positively interconnected with the measuring tape of the tape measure.

Another object of the invention is to provide a universal tape and drywall scoring apparatus of the character described in the preceding paragraphs that can be used with equal efficiency by left-handed and right-handed workmen. More particularly, it is an object of the invention to provide a universal tape and drywall scoring apparatus in which the cutting assembly of the apparatus can be connected to said clip assembly of the apparatus in a first position for use by a right-handed workman to score the panel in a first direction and can be connected to said clip assembly in a second position for use by a left-handed workman scoring the panel in a second direction.

The forgoing as well as other objects of the invention will be achieved by the novel apparatus of the invention illustrated in the accompanying drawings and described in the specification that follows.

BRIEF DESCRIPTION OF THE DRAWINGS

FIG. 2 is a generally perspective, exploded view of the clip assembly of the invention that can be interconnected with the distal end of the tape of a conventional tape measure and the cutting assembly that is releasably connected to the clip assembly.

FIG. 3 is a generally perspective view of the clip assembly of the invention.

FIG. 3A is a generally perspective, fragmentary view of the torsion pin component of the tape securement sub-assembly of the clip assembly that functions to releasably secure the hollow housing of the clip assembly to the measuring tape of the tape measure.

FIG. 4 is a front elevational view of the assemblage shown in FIG. 2 in an assembled configuration.

FIG. 5 is an enlarged view taken along lines 5-5 of FIG. 4.

FIG. 6 is an enlarged cross-sectional view taken along lines 6-6 of FIG. 4.

FIG. 9 is a generally perspective exploded view similar to FIG. 6, but showing the left-hand configuration of the scoring assembly of the invention FIG. 10 is a generally perspective, exploded view of the tape measure encasement component of the apparatus of the invention.

FIG. 11 is a front view of the tape measure encasement component showing the housing of the tape measure in position within the tape measure encasement component.

FIG. 12 is a greatly enlarged cross-sectional view taken along lines 12-12 of FIG. 14.

FIG. 13 is a view taken along lines 13-13 of FIG. 12.

FIG. 14 is a side elevational view illustrating the housing of the tape measure in position within the tape measure encasement component, showing the tape of the tape measure extended and showing in phantom lines the clip assembly in position over the distal end of the tape measure.

FIG. 15 is a top plan view illustrating the housing of the tape measure in position within the tape measure case component and showing the tape of the tape measure partially extended.

DESCRIPTION OF THE INVENTION

Figure 1:
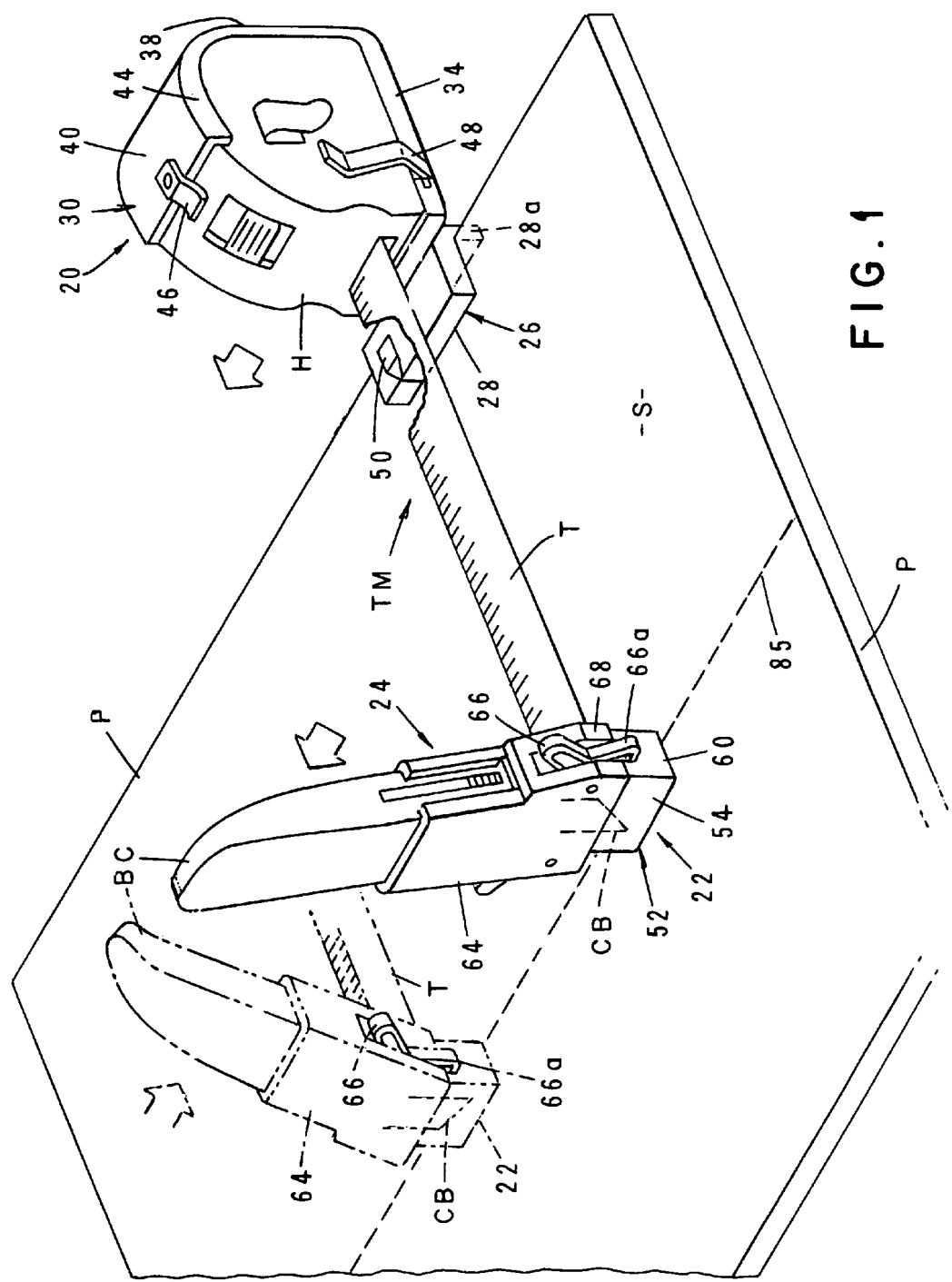
FIG. 1 is a generally perspective, diagrammatic view of one form of the universal tape and drywall scoring apparatus of the invention, showing in solid lines the arrangement of the scoring assembly of the device for use by a right-handed workman and showing in phantom lines the arrangement of the scoring assembly of the device for use by left-handed workman.
Figure 7:
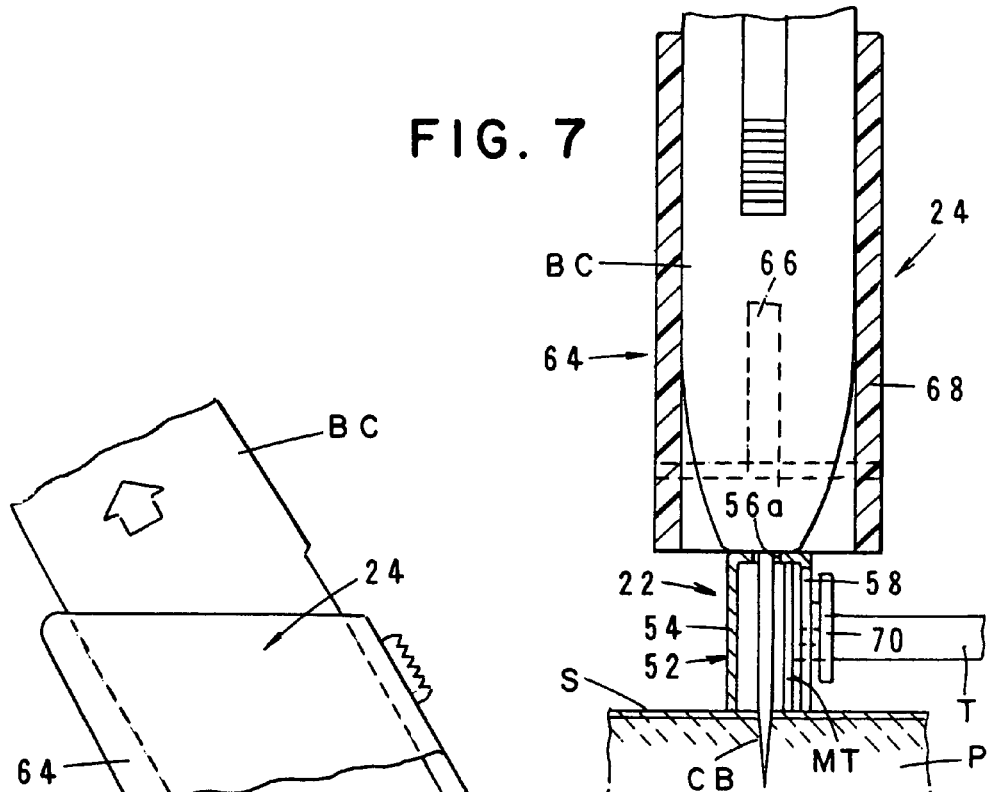
FIG. 7 is a cross-sectional view taken along lines 7-7 of FIG. 6.

Referring to the drawings and particularly to FIG. 1, one form of the apparatus of the invention for measuring, marking and cutting a panel "P", such as a sheet of drywall having an upper surface "S", is there shown. The apparatus of the invention is used in combination with a conventional tape measure "TM" having a housing "H" and a self-recoiling measuring tape "T" extendible from the housing. The elongate measuring tape, which has a slight upward transverse curvature, typically retractably unrolls from a slot in the housing. At its distal end, the tape is provided with a short metal tab "MT" (FIG. 2) that serves the dual function of preventing the free end of the steel tape from entering the housing of the tape measure through the slot in the housing when retracted and providing the user of the tape measure with a means of conveniently grasping the free end of the tape when manipulating the tape.

The apparatus of the present form of the invention comprises three major components, namely a tape measure encasement assembly 20 for encasing a portion of the tape measure housing "H", a clip assembly 22 adapted to be releasably connected to the distal end of the measuring tape and a cutting assembly 24 that is adapted to be releasably connected to the clip assembly.

Considering first the novel tape measure encasement assembly 20, as best seen in FIGS. 1 and 10 of the drawings, this novel assembly includes a base assembly 26 comprising a platform assembly 28 having a downwardly extending guide segment 28a and an encasement assembly 30 that is connected to platform assembly 28 by conventional fasteners 32 (FIG. 10). As best seen in FIG. 10, encasement assembly 30 includes a base wall 34, a sidewall 36 connected to base wall 34 and an end wall 38 that is also connected to base wall 34. End wall 38 includes a top wall portion 40 and a downwardly extending flange portion 44. A yieldably deformable retaining clip 46 is connected to top wall portions 40 and is constructed and arranged to engage the housing of the tape measure when the housing is in position within the encasement assembly 30 in the manner shown in FIG. 1 of the drawings. Also forming a part of the encasement assembly 30 is a retainer 48 that is pivotally connected to base wall 34 for movement between a first position shown by the solid lines in FIG. 11 where the extremity of the retainer is in engagement with the housing of the tape measure and a second lowered position shown by the phantom lines in FIG. 11.

Forming a part of the platform assembly 28 of the encasement assembly is the important roller wheel assembly 50 of the invention for measuring the travel of the tape measure encasement relative to the panel "P". The details of construction and operation of this important lower wheel assembly will be discussed in the paragraphs that follow.

Referring particularly to FIGS. 1, 2 and 3 of the drawings, the previously identified clip assembly 22 of the invention, which is releasably connected to the distal end of the measuring tape, can be seen to comprise a hollow housing 52 having a front wall 54, a top wall 56 connected to the front wall, a rear wall 58 connected to the top wall and a pair of spaced apart side walls 60 that are also connected to the top wall in the manner shown in the drawings. For a purpose presently to be described, top wall 56 is provided with a slot 56a and each of the side walls 60 is provided with a cavity 60a.

As best seen in FIG. 3 of the drawings, a novel tape securement clip assembly 62 is connected to the rear wall 58 of the housing 52 for releasably securing the hollow housing to the measuring tape "T" of the tape measure. The construction and operation of the securement clip assembly will presently be described.

Releasably connected to the clip assembly 22 is the previously identified cutting assembly 24 that here comprises a sheath structure 64 that is uniquely designed to carry a cutting instrument such as a conventional, readily commercially available box cutter "BC" (FIG. 2). When the cutting instrument is seated within the sheath structure 64 in the manner illustrated in FIG. 2, the cutting blade "CB" of the cutting instrument extends downwardly from the bottom wall of the sheath structure. When the sheath assembly 24 is mated with the clip assembly 22 in the manner illustrated in FIGS. 5 and 6 of the drawings, the cutting blade is received within the slot 56a formed in the clip assembly housing 52 and extends downwardly into cutting engagement with the panel "P".

Figure 8:
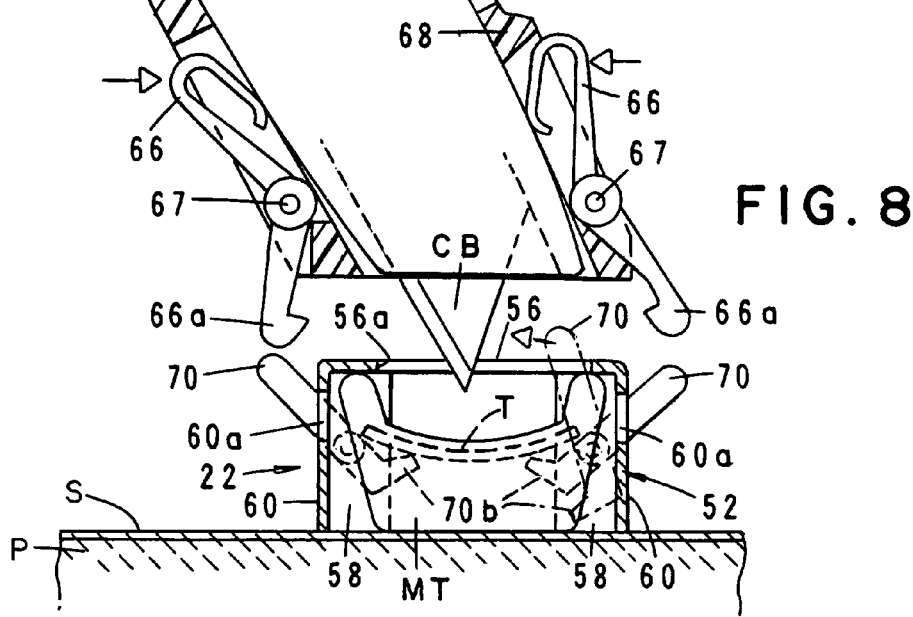
FIG. 8 is a cross-sectional view similar to FIG. 6, but showing the scoring blade receiving assembly disconnected from the clip assembly.

Sheath assembly 24 includes a pair of spaced apart connector members 66 that are pivotally connected to the housing 68 of the sheath assembly in the manner illustrated in FIGS. 6 and 8 of the drawings. Each of the connector members 66 has an end portion 66a and each is movable about a pivot pin 67 from a first retracted position shown in FIG. 8 of the drawings into a second gripping position shown in FIG. 6 of the drawings. When the connector members are in the second gripping position, the end portions 66a thereof are receivable within the cavities 60a formed in said side walls of said clip assembly.

In using the apparatus of the invention, the retainer member 48 of the tape measure encasement assembly 20 is first moved into its lowered position and the housing "H" of the tape measure is positioned within the encasement assembly 30. This done, the retainer member is moved into its upper position so as to securely lock the housing of the tape in position within the encasement assembly 30.

Next, the clip assembly 22 is interconnected with the distal end of the tape in the manner illustrated in FIG. 8 of the drawings. This step is accomplished by gripping the upper extremities 70a of the locking arms 70 of the tape securement clip assembly 62 and moving them inwardly against the urging of the torsion pin assemblies 72 which interconnect the locking with the rear wall of the clip assembly (see FIG. 3). This inward movement of the upper extremities of the locking arms 70 causes the lower tape engaging extremities 70b of the locking arms to separate, permitting the tape "T" to pass between the extremities 70b. Upon the release of the upper extremities of the locking arms, the torsion springs 72a of the torsion pin assemblies 72 (see FIG. 3A) will urge the lower tape engaging extremities 70b of the locking arms into engagement with the lower surface of the tape (see FIG. 6).

With the clip assembly 22 connected to the distal end of the tape, the downwardly extending guide segment 28a of the platform assembly 28 can be positioned against the edge of the panel to be cut in the manner illustrated in FIG. 1 of the drawings. Next, the tape "T" can be withdrawn from the housing "H" to a distance corresponding to the location at which the panel is to be scored (for example see the dotted line 85 in FIG. 1). With the clip assembly in the correct position, the cutting assembly 24 can be mated with the clip assembly in the manner previously described. If the workman is right handed, the cutting assembly will be mated with the clip assembly in the manner shown by the solid lines in FIG. 1. Conversely, if the workman is left handed, the cutting assembly will be mated with the clip assembly in the manner shown by the phantom lines in FIG. 1.

With the apparatus in the position illustrated in FIG. 1 of the drawings, the scoring operation can be commenced by simultaneously moving the tape measure encasement assembly 20 and a cutting assembly 24 longitudinally of the panel. As the tape measure encasement assembly 20 moves longitudinally of the panel, the previously identified roller wheel assembly 50 of the invention will measure the travel of the tape measure encasement relative to the panel. The roller wheel assembly 50, which is of a conventional construction, comprises roller 88 that is rotatably carried by platform 26. Roller 88 is mechanically coupled with a counter 90 that is also carried by platform 26 and includes indicia 89 that is visible through a window 92 provided in the platform (See FIGS. 10-15).

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. In combination with a tape measure, an apparatus for measuring, marking and cutting a panel having an upper surface, the tape measure having a housing and a self-recoiling measuring tape extendible from the housing, the measuring tape having a distal end, said apparatus comprising:
   (a) a tape measure encasement assembly for encasing a portion of the tape measure housing, said tape measure encasement assembly including a base having a downwardly extending guide segment;
   (b) a clip assembly connected to the distal end of the measuring tape, said clip assembly comprising a hollow housing having a top wall provided with a slot and a pair of spaced apart side walls each having a cavity formed therein; and
   (c) a cutting assembly connected to said clip assembly, said cutting assembly comprising a scoring blade receivable within said slot in said top wall of said hollow housing of said clip assembly and a pair of spaced apart connector members having end portions receivable, said cavities formed in said side walls of said clip assembly.

2. The apparatus as defined in claim 1 in which said clip assembly further includes a securement clip assembly for releasably securing said hollow housing of said clip assembly to the measuring tape of the tape measure.

3. The apparatus as defined in claim 1 in which said tape measure encasement assembly further includes a roller wheel assembly connected to said base of said tape measure encasement assembly for measuring the travel of said tape measure encasement relative to the panel, said roller wheel assembly comprising a roller wheel constructed and arranged to engage the upper surface of the panel.

4. The apparatus as defined in claim 1 in which said tape measure encasement further includes a sidewall connected to said base, top wall connected to said side wall, said base, said top wall and said side wall cooperating to define a tape measure housing receiving chamber.

5. The apparatus as defined in claim 4 in which said tape measure encasement further includes a yieldably deformable retaining clip connected to said top wall of said tape measure encasement for engagement with the housing of the tape measure.

6. The apparatus as defined in claim 4 in which said tape measure encasement further includes a retainer pivotally connected to said base for movement between a first position in engagement with the housing of the tape measure and a second lowered position.

7. The apparatus as defined in claim 6 in which said top wall of said tape measure encasement further includes a downwardly extending flange for engagement with the housing of the tape measure.

8. In combination with a tape measure, an apparatus for measuring, marking and cutting a panel having an upper surface, the tape measure having a housing and a self-recoiling measuring tape extendible from the housing, the measuring tape having a distal end, said apparatus comprising:
   (a) a tape measure encasement assembly for encasing a portion of the tape measure housing, said tape measure encasement assembly including a base having a downwardly extending guide segment, a sidewall connected to said base, a top wall connected to said side wall, said base, said top wall and said side wall cooperating to define a tape measure housing receiving chamber;
   (b) a clip assembly releasably connected to the distal end of the measuring tape, said clip assembly comprising a hollow housing having:
      (i) a front wall;
      (ii) a top wall connected to front wall said top wall having a slot;
      (iii) a pair of spaced apart side walls connected to said top wall each said side wall having a cavity formed therein; and
      (iv) a securement clip assembly connected to said front wall for releasably securing said hollow housing of said clip assembly to the measuring tape of the tape measure; and
   (c) a cutting assembly connected to said clip assembly, said cutting assembly comprising a scoring blade receivable within said slot in said top wall of said hollow housing of said clip assembly and a pair of spaced apart connector members having end portions receivable said cavities formed in said side walls of said clip assembly.

9. The apparatus as defined in claim 8 in which said tape measure encasement assembly further includes a roller wheel assembly connected to said base of said tape measure encasement assembly for measuring the travel of said tape measure encasement relative to the panel, said roller wheel assembly comprising a roller wheel constructed and arranged to engage the upper surface of the panel and a counter assembly operably associated with said roller wheel.

10. The apparatus as defined in claim 8 in which said tape measure encasement further includes a yieldably deformable retaining clip connected to said top wall of said tape measure encasement for engagement with the housing of the tape measure.

11. The apparatus as defined in claim 8 in which said tape measure encasement further includes a retainer pivotally connected to said base for movement between a first position in engagement with the housing of the tape measure and a second lowered position.

12. The apparatus as defined in claim 8 in which said top wall of said tape measure encasement further includes a downwardly extending flange for engagement with the housing of the tape measure.

13. The apparatus as defined in claim 8 in which said cutting assembly can be connected to said clip assembly in a first position for scoring the panel in a first direction and can be connected to said clip assembly in a second position for scoring the panel in a second direction.

14. In combination with a tape measure, an apparatus for measuring, marking and cutting a panel having an upper surface, the tape measure having a housing and a self-recoiling measuring tape extendible from the housing, the measuring tape having a distal end, said apparatus comprising:
 (a) a tape measure encasement assembly for encasing a portion of the tape measure housing, said tape measure encasement assembly including:
  (i) a base having a downwardly extending guide segment;
  (ii) a sidewall connected to said base;
  (iii) a top wall connected to said side wall;
  (iv) a yieldably deformable retaining clip connected to said top wall for engagement with the housing of the tape measure; and
  (v) a retainer pivotally connected to said base for movement between a first position in engagement with the housing of the tape measure and a second lowered position;
 (b) a clip assembly releasably connected to the distal end of the measuring tape, said clip assembly comprising a hollow housing having:
  (i) a front wall;
  (ii) top wall connected to front wall said top wall having a slot;
  (iii) a pair of spaced apart side walls connected to said top wall each said side wall having a cavity formed therein; and
  (iv) a securement clip assembly connected to said front wall for releasably securing said hollow housing of said clip assembly to the measuring tape of the tape measure; and
 (c) a cutting assembly connected to said clip assembly, said cutting assembly comprising a scoring blade receivable within said slot in said top wall of said hollow housing of said clip assembly and a pair of spaced apart connector members having end portions receivable said cavities formed in said side walls of said clip assembly.

15. The apparatus as defined in claim 14 in which said tape measure encasement assembly further includes a roller wheel assembly connected to said base of said tape measure encasement assembly for measuring the travel of said tape measure encasement relative to the panel, said roller wheel assembly comprising a roller wheel constructed and arranged to engage the upper surface of the panel and a counter assembly operably associated with said roller wheel.

16. The apparatus as defined in claim 14 in which said top wall of said tape measure encasement further includes a downwardly extending flange for engagement with the housing of the tape measure.

17. The apparatus as defined in claim 14 in which said cutting assembly can be connected to said clip assembly in a first position for scoring the panel in a first direction and can be connected to said clip assembly in a second position for scoring the panel in a second direction.

18. The apparatus as defined in claim 14 in which said cutting assembly comprises a sheath for removably carrying a cutting implement.

\* \* \* \* \*